United States Patent
Hasharoni et al.

(10) Patent No.: US 9,645,316 B1
(45) Date of Patent: May 9, 2017

(54) PARALLEL OPTICAL INTERCONNECT

(75) Inventors: Jacob Hasharoni, Srigim (IL);
Yehoshua Benjamin, Shimshit (IL);
Gideon Katz, Zoran (IL); Amir Geron,
Modi'in (IL); Michael Mesh, Kfar Saba (IL)

(73) Assignee: Compass Electro Optical Systems Ltd., Netanya (IL)

( * ) Notice: Subject to any disclaimer, the term of this patent is extended or adjusted under 35 U.S.C. 154(b) by 293 days.

(21) Appl. No.: 13/592,016

(22) Filed: Aug. 22, 2012

Related U.S. Application Data

(60) Provisional application No. 61/564,691, filed on Nov. 29, 2011.

(51) Int. Cl.
G02B 6/32 (2006.01)
G02B 6/42 (2006.01)
G02B 6/43 (2006.01)

(52) U.S. Cl.
CPC .............. *G02B 6/32* (2013.01); *G02B 6/4204* (2013.01); *G02B 6/4214* (2013.01); *G02B 6/4249* (2013.01); *G02B 6/43* (2013.01)

(58) Field of Classification Search
CPC .. G02B 6/4214; G02B 6/4204; G02B 6/4249; G02B 6/43
See application file for complete search history.

(56) References Cited

U.S. PATENT DOCUMENTS

| | | | | |
|---|---|---|---|---|
| 6,641,310 | B2 * | 11/2003 | Williams | G02B 6/3825 385/54 |
| 7,526,159 | B2 * | 4/2009 | Haney et al. | 385/33 |
| 7,548,682 | B2 * | 6/2009 | Last et al. | 385/137 |
| 7,702,191 | B1 | 4/2010 | Geron et al. | |
| 7,853,105 | B2 * | 12/2010 | Budd et al. | 385/52 |
| 9,063,313 | B1 | 6/2015 | Hasharoni | |
| 2002/0102060 | A1 * | 8/2002 | Jewell | G02B 6/4206 385/49 |
| 2002/0159669 | A1 * | 10/2002 | Shekel et al. | 385/8 |
| 2007/0160319 | A1 * | 7/2007 | Wang | 385/14 |
| 2011/0108716 | A1 * | 5/2011 | Shiraishi | 250/227.24 |
| 2012/0138471 | A1 * | 6/2012 | Mayer | C25D 21/12 205/170 |

* cited by examiner

*Primary Examiner* — Thomas A Hollweg
*Assistant Examiner* — Mary A El Shammaa
(74) *Attorney, Agent, or Firm* — Wilmer Cutler Pickering Hale and Dorr LLP

(57) ABSTRACT

A method for assembling an optical interconnect apparatus is provided. The optical interconnect comprises an integrated circuit chip, and at least one optoelectronic chip positioned on the integrated circuit chip, each of the at least one optoelectronic chip including a 2-dimensional optoelectronic array. The optical interconnect further comprises a first and a second microlens array, a bundle of optical fibers coupled to each second microlens array and supported by a bundle housing, and a block structure supporting the bundle housing to a printed circuit board (PCB).

24 Claims, 6 Drawing Sheets

PARALLEL OPTICAL INTERCONNECT

CROSS-REFERENCE TO RELATED APPLICATION

This application claims priority under 35 U.S.C. §119(e) to U.S. Provisional Application No. 61/564,691, filed on Nov. 29, 2011, entitled "ROUTER AND ELECTRO-OPTICAL CHIP ASSEMBLY."

FIELD OF THE INVENTION

The present invention relates to an optical package of optoelectronic chips assembled on a CMOS chip and its application as an optical interconnect device.

BACKGROUND OF THE INVENTION

The ever growing demand for more bandwidth in telecom, datacom and in data center (computercom) applications has led to various attempts to improve the efficiency of optical transmitter-receiver (transceiver) devices which are the building blocks of optical interconnects. Typical applications are found in high performance computing, storage servers, switches and routers. Common to all of these applications is the need to route data between several application specific integrated circuits ("ASIC"), usually processors or memory.

To facilitate an optical interconnect, the transceiver module must be electrically coupled to the ASIC chip which is handling the logic tasks of a specific application. Efficient packaging and thermal relief system are thus needed especially when the transceiver is physically located on the ASIC. Optical interconnection between various chips can be carried out using any optical routing technique, for example, fiber optics, waveguides or free space propagation. The required high efficiency is achieved by employing parallel optical links in the form of two-dimensional optoelectronic matrices usually consisting of vertical cavity surface emitting lasers (VCSEL) and matrices of p-i-n photodiodes (PD).

Practical realization of dense optical interconnect is limited due to the fact that industry standard optoelectronic devices are based on one-dimensional, 1×12 arrays of VCSEL and PD. This limits the number of channels that can be used in a practical device. Additionally, the analog circuitry required to drive these optoelectronic chips is typically not monolithically integrated but rather assembled adjacent to the chips and connected either by wire bonds or via an interposer chip. Such complications limit the usefulness of optical interconnects leading to low utilization of the device area. Utilizing large, two-dimensional (2D), optoelectronic devices and packaging the analog circuitry in a space-efficient manner can increase the bandwidth per unit area.

U.S. Pat. No. 7,702,191 discusses a method of assembling large, two-dimensional, optoelectronic chips on an ASIC chip, the contents of which are incorporated herein in their entirety. This application uses a different method for attaching the optical routing elements to the device.

SUMMARY OF THE INVENTION

According to aspects of the invention, an optical interconnect apparatus is disclosed. The optical interconnect apparatus includes an integrated circuit chip and at least one optoelectronic chip positioned on the integrated circuit chip. Each of the at least one optoelectronic chip can include a 2-dimensional optoelectronic array. The optical interconnect apparatus also includes a first microlens array positioned on each of the at least one optoelectronic chip, a second microlens array spaced above and optically coupled to each first microlens array, a bundle of optical fibers coupled to each second microlens array and supported by a bundle housing, and a block structure supporting the bundle housing to a printed circuit board (PCB). According to aspects of the invention, the integrated circuit chip includes circuitry for controlling the at least one optoelectronic chip.

A method of assembling an optical interconnect apparatus is also disclosed. The method includes positioning via flipchip bonding at least one optoelectronic chip on an integrated circuit chip, each of the at least one optoelectronic chips including a 2-dimensional optoelectronic array, positioning via flipchip bonding a first microlens array on each of the at least one optoelectronic chips, and positioning via flipchip bonding a second microlens array spaced above and optically coupled to each first microlens array. The method further includes coupling a bundle of optical fibers to each second microlens array, supporting the bundle of optical fibers through a bundle housing, and supporting the bundle housing to a PCB through a block structure.

BRIEF DESCRIPTION OF THE DRAWINGS

The present invention will be further understood and appreciated from the following detailed description taken in conjunction with the drawings in which.

DETAILED DESCRIPTION OF THE INVENTION

Figure 1:
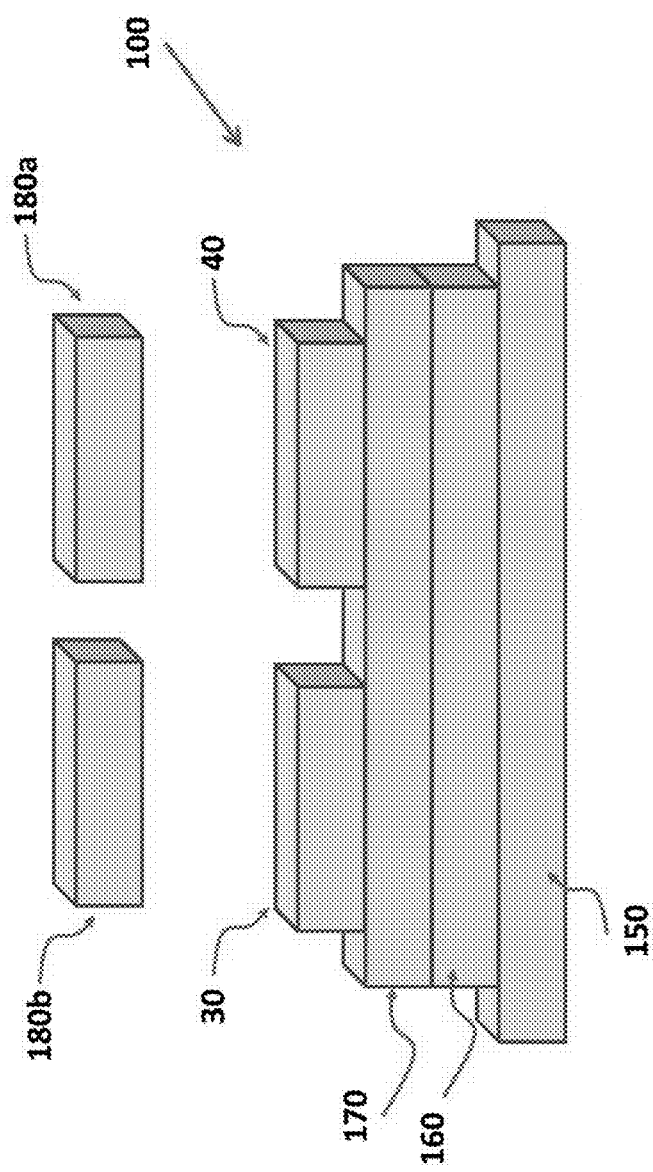
FIG. 1 shows a schematic representation of a densely-packaged optical interconnect.

A schematic representation of a densely-packaged optical interconnect is shown in FIG. 1 in the form of logical blocks. The interconnect 100 is based on an ASIC chip 160, analog circuitry 170, optoelectronic chips 30 and 40, and optical routing elements 180. A heat spreading element 150 is located below the ASIC 160. According to particular embodiments of the present invention, optoelectronic chips 30 and 40 are 2D matrices of VCSELs or PDs. Routing elements 180 are typically matrices of optical fibers, which can have an identical layout to the optoelectronic chips. According to alternative embodiments of the present invention, elements 180a and 180b can be waveguide arrays embedded either in an organic printed circuit board (PCB) or fibers embedded in a flexible matrix such as an optical shuffle. One routing element 180 in FIG. 1, for example 180b, can be used for signal transmission while the other for signal reception, e.g. 180a. In that case, the optoelectronic matrices 30 and 40 are VCSEL and PD, respectively.

Figure 2:
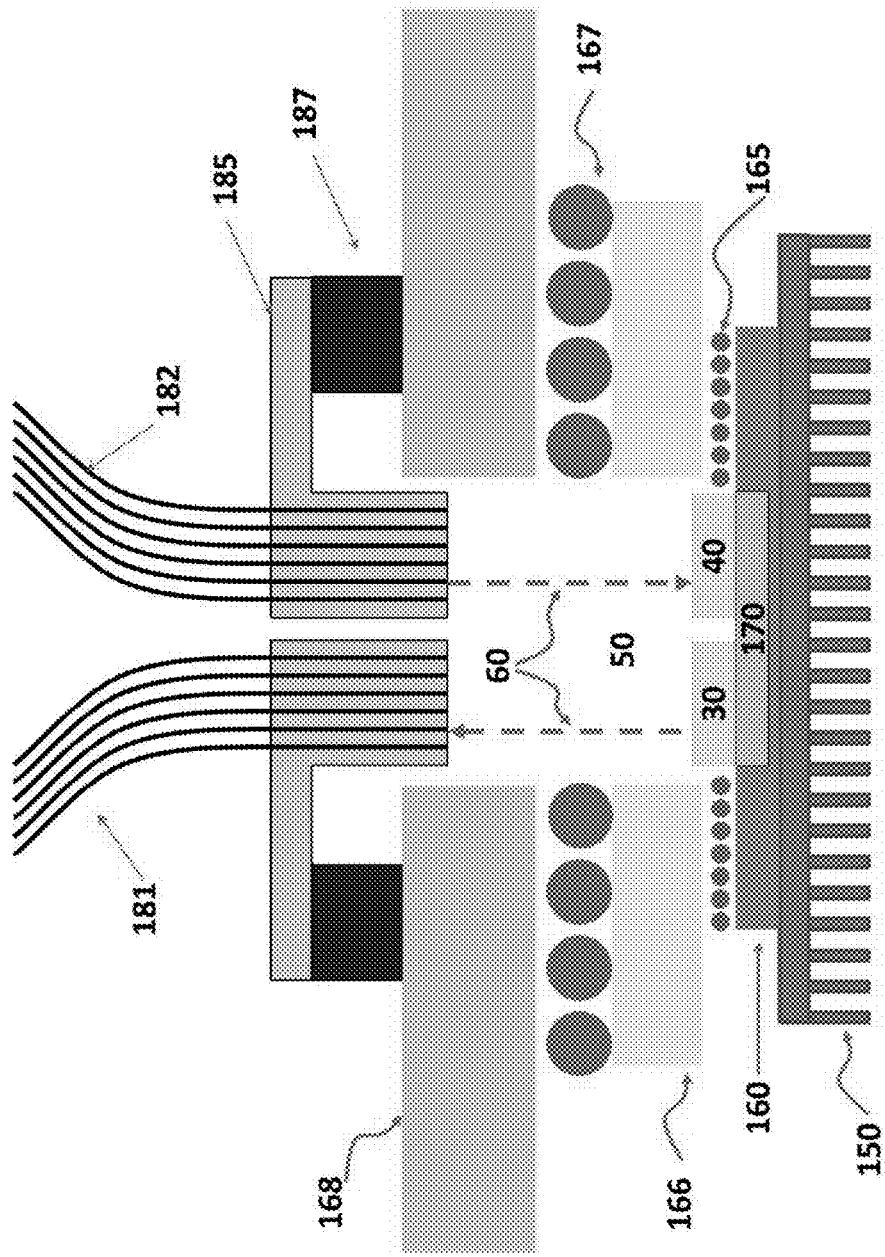
FIG. 2 shows a cross section of an optical interconnect according to aspects of the invention.

A detailed cross section of the optical interconnect 100 is shown in FIG. 2. An optical transceiver is constructed from a matrix of VCSEL transmitters 30 with n×m elements. The dimensions of the VCSEL transmitter, i.e., "n" and "m" can be of any size, for example, "n" and "m" can range between 10 and 20. Lasers are grown on a GaAs substrate and are flipchip bonded to the analog circuitry 170. The PD matrix 40 can have the same n×m element layout on an InP substrate and is also flipchip bonded to the analog circuitry 170. According to aspects of the present invention, the analog circuitry 170 can be embedded within the digital CMOS chip 160. Connection of the ASIC to the PCB 168 is carried out via an intermediate organic board 166. The organic board 166 can facilitate electrical connection between large numbers of I/O bumps 165, located on the CMOS, and the ball grid array (BGA) 167. The BGA usually has a smaller number of bumps smaller due to their larger diameter.

Coupling of light from and to the transceiver is carried out via optical routing elements, which according to aspects of the invention can be bundles of optical fibers. The bundle layout can be identical to the n×m layout of VCSEL matrix 30 and PD matrix 40. Two fiber bundles can be used, one for routing light emitted by the VCSEL matrix, 181, and one for routing light received by the PD matrix, 182.

The fiber bundles 181 and 182 are located directly above their corresponding optical chips. An optical path 60 is formed between each element in the optoelectronic chips and each fiber on the fiber bundles via free space 50 and the openings in both substrate 166 and PCB 168. The fiber bundles are attached to the PCB surface using blocks 187 made from any rigid material, such as, but not limited to aluminum or glass. Thermo-setting polymeric glue can be used for adhesion between the bundle housing 185 and the block 187 and also between the block and the PCB surface. The shape of the mounting block follows the contour of the bundle housing 185 such that the adhesion area is maximized. According to aspects of the present invention, the PCB 168 can serve as a mechanical base for fiber optic bundles. It should be noted that "above" or "below" are used throughout the disclosure simply with reference to one view of the device, and are not supposed to restrict how the device might be positioned or used.

Figure 3:
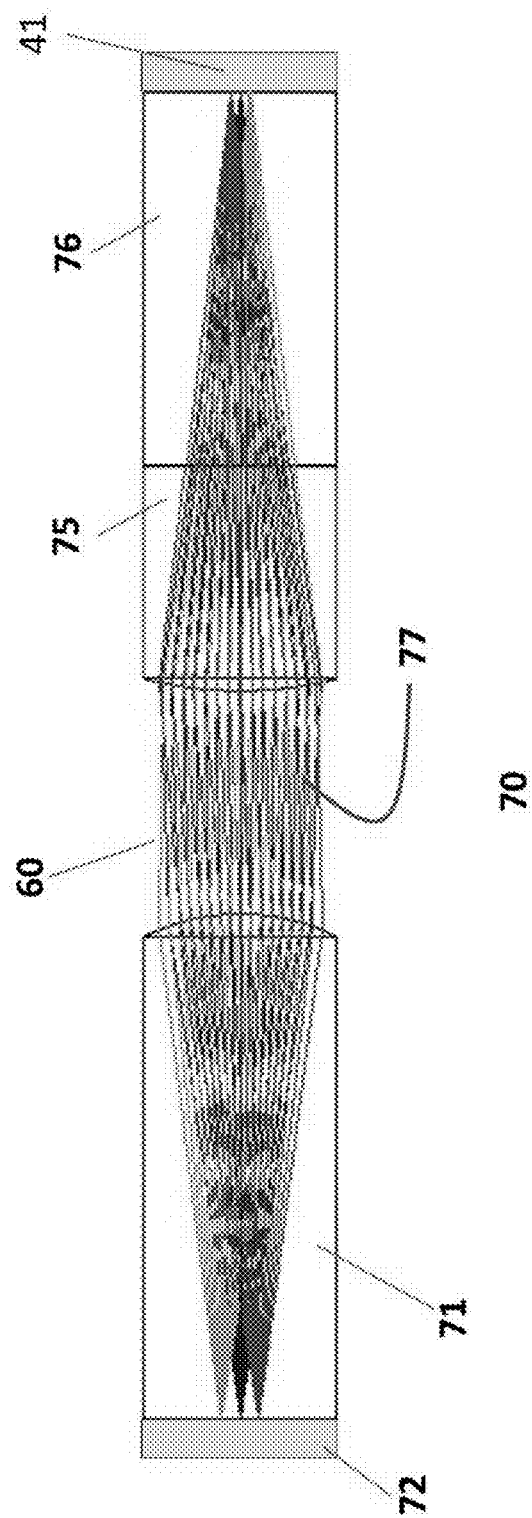
FIG. 3 shows a dual lens system according to aspects of the invention.

Optical coupling between the VCSEL 30 and PD 40 matrices and the fiber bundles 181 and 182 can be carried out using a dual lens system. A dual lens system is described in U.S. patent application Ser. No. 13/543,347, filed on Jul. 6, 2012, entitled "Fiber Coupling Using Collimated Beams," the contents of which are incorporated herein by reference. FIG. 3 shows a dual lens system 70. The lens system 70 comprises two separate microlens arrays with n×m elements with an identical layout to both the optoelectronic chips and the fiber bundles. The two microlens arrays of dual lens system 70 are designed such that they can couple light between the VCSEL and the fiber and between the fiber and the PD. A first microlens array 71 is glued onto both the transmit fiber bundle 181 face and onto the receive fiber bundle 182 face. The lens 71 can be made from glass and glued onto the fiber bundle face 72 using any conventional optical glue. The second microlens array 75 is glued onto the VCSEL and PD substrates 76 made from GaAs and InP, respectively. The lens 75 is also made from III-V semiconductor material to minimize thermal expansion effects. The dual lens system is separated by free space 60 which can be, for example, in the range of 0.1 to 1 mm. The optical path shown in FIG. 3 is for a single VCSEL-to-fiber path or a single fiber-to-PD path with the light beam 77 collimated between lenses in the free space 60, which results in relaxed alignment tolerances.

Both optoelectronic devices can be square-shaped, with an area, for example, of 12-15 mm$^2$; these chips are flipchip bonded onto the analog chip 170, which can be embedded within the digital CMOS chip 160. Since conventional optoelectronic chips are top illuminating, there is a need to reverse the direction of light propagation to and from these chips in order to avoid obstruction of the light beams by the opaque CMOS substrate. The optoelectronic chips are made back illuminating by altering the order of reflecting mirror stacks and electrodes around the laser active region. Thus, the VCSEL 30 and PD 40 are back illuminated with light propagating through the GaAs and InP substrates. The industry standard VCSEL wavelength is 850 nm; at this wavelength, both GaAs and InP absorb light making the back illumination impossible. In order to overcome this obstacle, the lasing wavelength is shifted from 850 nm to 1000 nm where the substrate materials are transparent. This wavelength shift is made possible by altering the active region composition with addition of Indium to the GaAs.

The CMOS chips 160 and 170 shown in FIG. 1 are fabricated as a single ASIC chip. This is a mixed signal device with both analog and digital blocks manufactured in a single digital CMOS process. According to alternative aspects of the invention, the ASIC chip contains only the analog circuitry required for operation of the optical interconnect 100, and is essentially a parallel n×m transceiver. In other embodiments, digital interface blocks are placed on either side of the analog circuitry and the device can perform various logic tasks, such as, but not limited to, telecom routing, switching for datacenter applications, and random access memory.

Figure 4:
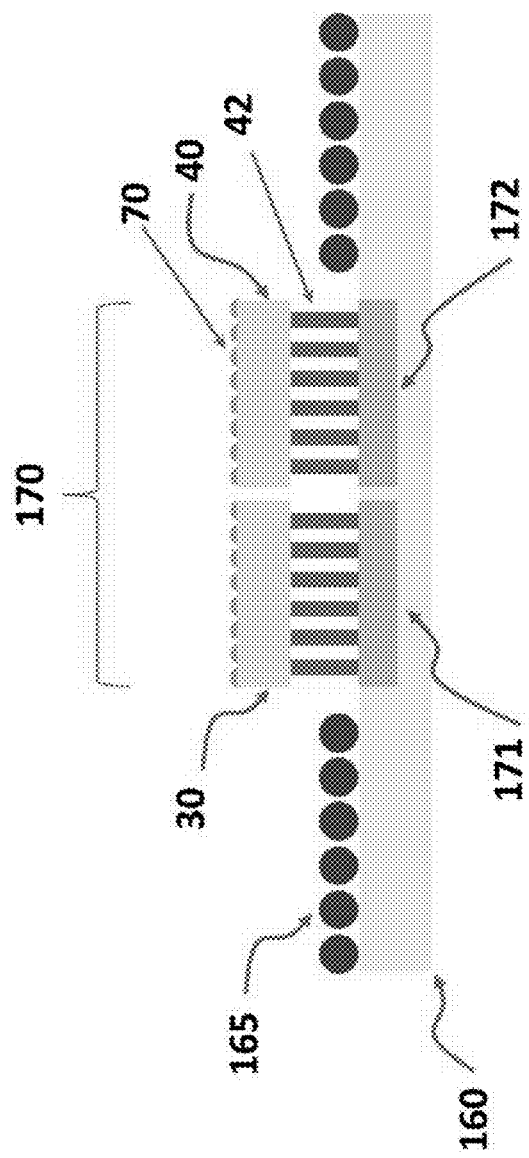
FIG. 4 shows a schematic of a chip packaging according to aspects of the invention.

FIG. 4 shows a schematic of the chip package, where both VCSEL 30 and PD 40 matrices are flipchip bonded on top of the CMOS chip using gold solder bumps 42. These solder bumps are in the shape of high aspect ratio pillars and can compensate for the mechanical stress due to the thermal expansion differences between silicon and III-V materials. The VCSEL chip is flipchip bonded over the laser driver circuitry 171, while the PD matrix is assembled above the receiver analog circuitry 172. Thus, each laser has its corresponding driver directly below and each PD has its corresponding receiver directly below. Evidently, the circuits 171 and 172 are n×m matrices of analog circuits. This package design has the dual benefit i) of minimal transmission link length between the circuits and optoelectronic chip and ii) of efficient packaging with minimal footprint utilization on the CMOS chip. The microlens array 70 can be assembled on the back surface of the optoelectronic chips. Electrical coupling of the digital chip 160 to the PCB is enabled via I/O bumps 165 which connect to the substrate 166 as described above. With such a configuration, the analog circuits and optoelectronic chips can consume only about 10% of the total CMOS chip. This efficiency allows for very high data density values of the optical interconnect while freeing the majority of the silicon chip to perform logic tasks.

Figure 5:
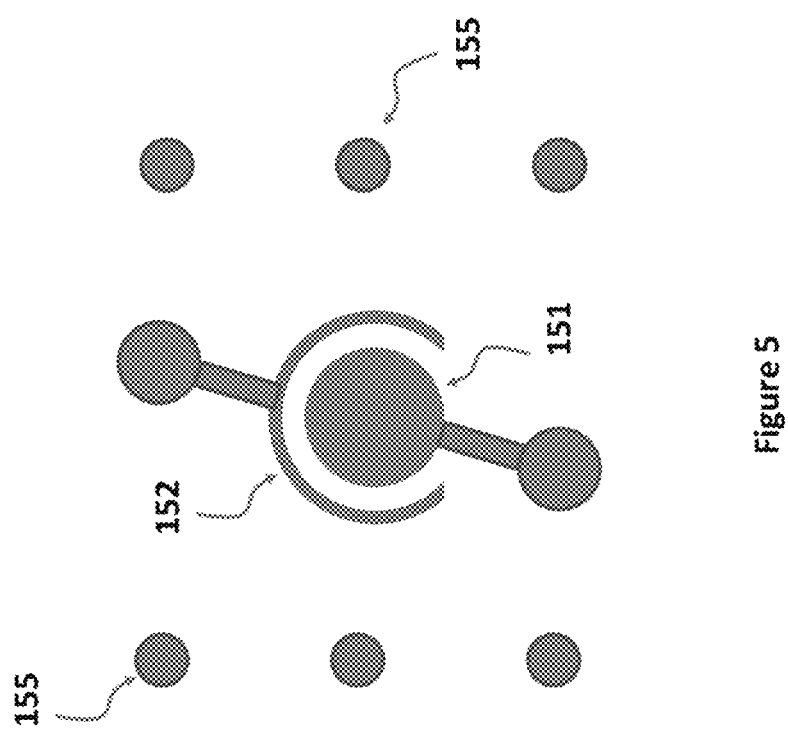
FIG. 5 shows an optical chips unit cell according to aspects of the invention.

Efficient thermal flow is another aspect of this invention as it is important for operation of the VCSEL matrix 30 and the PD matrix 40. These chips are designed to operate up to about 90° C. and would deteriorate at high temperatures without cooling. According to aspects of the present invention, the optical package includes a thermal link running from the VCSEL and PD all the way to a heat sink 150 assembled below the CMOS chip 160. Thus, each unit cell of the optical chips, depicted in FIG. 5, contains the anode 151 and cathode 152 bumps and several thermal bumps 155 which are in direct contact with the GaAs or InP substrate. These thermal bumps are linked via the gold pillars 42 to the largest metal plates within the CMOS chip 160 that are used for voltage or ground signals. The metal plates spread the heat laterally on the chip followed by thermal conductance via the silicon substrate to the heat sink. Forced air flow is used to remove the heat from the system via convection. This design allows for efficient heat transfer from the optical chips to the heat sink thereby cooling the optical chips and allowing maintaining a stable temperature.

Figure 6:
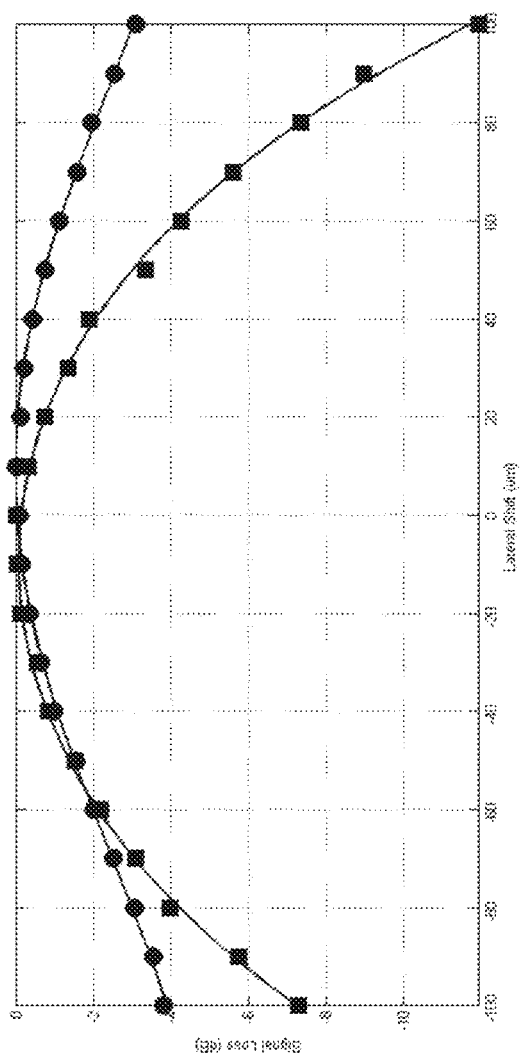
FIG. 6 shows a graph of the signal loss as a function of lateral shift, according to aspects of the invention.

The optical packaging of the present inventions can effectively handle deterioration effects that are introduced as the device ages. Specific problems associated with device aging relate to bow and twist of the PCB 168, or movement of the bundle attachment cubes 187. In either case, the optical path 60 between optoelectronic chips 30, 40 and fiber bundles 181, 182 could be distorted by several tens of microns, leading to loss of optical coupling or cross talk between adjacent channels. However, using collimated optics between the two microlens arrays, as shown in FIG. 3, allows compensating for such distortions. An example of such compensation using collimated optics is shown in FIG. 6. FIG. 6 shows the coupling loss of the VCSEL 30 to fiber 181 (squares) and fiber 182 to PD 40 (circles) as a function of the fiber bundle lateral shift. It can be appreciated that only a modest 3 dB loss is found even with large shifts, of >60 µm. At the nominal position, where there is no distortion, the loss is zero. With reference to FIG. 3, the collimated beam 77 between the two lenses 71 and 75 will be focused on the fiber face or on the PD aperture even if the two lenses have moved apart by several 10s of microns due to aging effects of the device.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. An optical interconnect apparatus comprising:
    an integrated circuit chip;
    at least one optoelectronic chip connected to the integrated circuit chip with solder bumps in the shape of high aspect ratio pillars, each of the at least one optoelectronic chip including a 2-dimensional optoelectronic array, wherein the solder bumps connecting each of the at least one optoelectronic chip to the integrated circuit chip include at least one anode bump, at least one cathode bump, and multiple thermal bumps;
    a first microlens array positioned on each of the at least one optoelectronic chip;
    a second microlens array spaced above and optically coupled to each first microlens array, wherein the second microlens array is separated from the first microlens array by free space;
    a bundle of optical fibers coupled to each second microlens array and directly supported by a bundle housing; and
    a block structure connecting the bundle housing to a printed circuit board (PCB);
    wherein the integrated circuit chip includes circuitry for controlling the at least one optoelectronic chip.

2. The optical interconnect apparatus of claim 1, wherein thermo-setting polymeric glue is used for adhesion between the bundle housing and the block structure.

3. The optical interconnect apparatus of claim 1, wherein thermo-setting polymeric glue is used for adhesion between the PCB and the block structure.

4. The optical interconnect apparatus of claim 1, wherein the block structure is shaped to conform to the bundle housing shape.

5. The optical interconnect apparatus of claim 1, wherein the block structure is made from aluminum or glass.

6. The optical interconnect apparatus of claim 1, wherein the integrated circuit chip is connected to the PCB through an organic board.

7. The optical interconnect apparatus of claim 6, wherein a first opening is defined in the PCB and a second opening is defined in the organic board for allowing light coupling between each first microlens array and corresponding second microlens array.

8. The optical interconnect apparatus of claim 1, further comprising a heat spreading element positioned below the integrated circuit chip.

9. The optical interconnect apparatus of claim 1, wherein the integrated circuit chip comprises a digital circuit and an analog circuit.

10. The optical interconnect apparatus of claim 9, wherein the optoelectronics chip includes:
    lasers grown on a GaAs substrate and flipchip bonded to the analog circuit; and
    photodiodes on an InP substrate and flipchip bonded to the analog circuit.

11. The optical interconnect apparatus of claim 1, wherein the solder bumps include gold.

12. The optical interconnect apparatus of claim 1, wherein the solder bumps are linked to metal plates within the integrated circuit chip used for voltage or ground signals.

13. A method of assembling an optical interconnect apparatus comprising:
    connecting via flipchip bonding at least one optoelectronic chip to an integrated circuit chip using solder bumps in the shape of high aspect ratio pillars, each of the at least one optoelectronic chip including a 2-dimensional optoelectronic array, wherein the solder bumps connecting each of the at least one optoelectronic chip to the integrated circuit chip include at least one anode bump, at least one cathode bump, and multiple thermal bumps;
    positioning a first microlens array on each of the at least one optoelectronic chips;
    positioning a second microlens array spaced above and optically coupled to each first microlens array, wherein the second microlens array is separated from the first microlens array by free space;
    coupling a bundle of optical fibers to each second microlens array;
    directly supporting the bundle of optical fibers through a bundle housing; and
    connecting the bundle housing to a PCB through a block structure.

14. The method of claim 13, further comprising using thermo-setting polymeric glue for adhesion between the bundle housing and the block structure.

15. The method of claim 13, further comprising using thermo-setting polymeric glue for adhesion between the PCB and the block structure.

16. The method of claim 13, further comprising constructing the block structure shape so as to conform to the bundle housing shape.

17. The method of claim 13, wherein the block structure is made from aluminum or glass.

18. The method of claim 13, further comprising connecting the integrated circuit chip to the PCB through an organic board.

19. The method of claim 13, further comprising providing a heat spreading element positioned below the integrated circuit chip.

20. The method of claim 13, wherein the integrated circuit chip comprises a digital circuit and an analog circuit.

21. The method of claim 20, wherein the optoelectronics chip includes:
- growing lasers on a GaAs substrate and flipchip bonding the lasers to the analog circuit; and
- growing photodiodes on an InP substrate and flipchip bonding the photodiodes to the analog circuit.

22. The method of claim 13, wherein an opening is defined in the PCB for allowing light coupling between each first microlens array and corresponding second microlens array.

23. The method of claim 13, wherein the solder bumps include gold.

24. The method of claim 13, wherein the solder bumps are linked to metal plates within the integrated circuit chip used for voltage or ground signals.

* * * * *